(12) United States Patent
Reisinger

(10) Patent No.: US 7,974,927 B2
(45) Date of Patent: Jul. 5, 2011

(54) MAILING MACHINE AND INITIALIZATION METHOD

(75) Inventor: Katrin Reisinger, Oranienburg (DE)

(73) Assignee: Francotyp-Postalia GmbH, Birkenwerder (GB)

( * ) Notice: Subject to any disclaimer, the term of this patent is extended or adjusted under 35 U.S.C. 154(b) by 777 days.

(21) Appl. No.: 09/917,541

(22) Filed: Jul. 27, 2001

(65) Prior Publication Data

US 2002/0013773 A1    Jan. 31, 2002

(30) Foreign Application Priority Data

Jul. 27, 2000   (DE) ................................. 100 36 623

(51) Int. Cl.
*G06Q 20/00*    (2006.01)
(52) U.S. Cl. ............................. 705/64; 705/67; 705/401
(58) Field of Classification Search .................... 705/60, 705/64, 67, 401
See application file for complete search history.

(56) References Cited

U.S. PATENT DOCUMENTS

| | | | | |
|---|---|---|---|---|
| 4,629,871 | A | * | 12/1986 | Scribner et al. |
| 4,694,492 | A | * | 9/1987 | Wirstrom et al. |
| 4,802,218 | A | * | 1/1989 | Wright et al. |
| 5,490,077 | A | * | 2/1996 | Freytag |
| 5,606,508 | A | * | 2/1997 | Thiel |
| 5,675,135 | A | * | 10/1997 | Martin |
| 5,805,711 | A | * | 9/1998 | Windel et al. |
| 6,418,422 | B1 | | 7/2002 | Guenther et al. |
| 6,424,954 | B1 | * | 7/2002 | Leon ............................. 705/401 |
| 6,557,104 | B2 | * | 4/2003 | Vu et al. .......................... 713/189 |
| 7,039,603 | B2 | * | 5/2006 | Walker et al. .............. 705/26.41 |
| 2002/0178071 | A1 | * | 11/2002 | Walker et al. ................... 705/26 |
| 2006/0242036 | A1 | * | 10/2006 | Walker et al. ................... 705/34 |
| 2008/0052189 | A1 | * | 2/2008 | Walker et al. ................... 705/26 |

FOREIGN PATENT DOCUMENTS

| | | |
|---|---|---|
| EP | 0 762 338 A2 | 3/1997 |
| EP | 0 818 722 A1 | 1/1998 |
| EP | 0 825 512 A2 | 2/1998 |
| EP | 0 825 566 A2 | 2/1998 |
| EP | 0 927 968 A2 | 7/1999 |
| GB | 2 074 942 A | 11/1981 |
| GB | 2 334 360 A | 8/1999 |
| WO | 98/13790 | 4/1998 |

OTHER PUBLICATIONS

United States Patent and Trademark Office-Before the Board of Patent Appeals and Interferences-Ex Parte Katrin Reisinger-U.S. Appl. No. 09/917,541-Maiuled Sep. 27, 2005-Order Returning Undocketed Appeal to Examiner.*

* cited by examiner

*Primary Examiner* — Pierre E Elisca
(74) *Attorney, Agent, or Firm* — Laurence A. Greenberg; Werner H. Stemer; Ralph E. Locher

(57) ABSTRACT

The mailing machine and a method of initializing it are based on an unremovable program memory, which contains an initialization program. A removable authorization device is operationally connected to the mailing machine and is designed such that it can be interrogated. The interrogation is performed before and during the initialization of the mailing machine with predetermined INIT data. A security module connected to the program memory serves for checking the authorization and can prevent initialization without authorization. The initialization of the mailing machine takes place at the goods receiving location in the destination country by switching into an initialization mode, authorization of the initialization by means of the authorization device, input of initialization data and ending of the initialization and cancellation of the authorization.

27 Claims, 6 Drawing Sheets

MAILING MACHINE AND INITIALIZATION METHOD

BACKGROUND OF THE INVENTION

1. Field of the Invention

The invention relates to a mailing machine of the type having a controller, a security module, and a non-removable program memory. The invention further pertains to a method of intializing a mailing machine of this type. The term mailing machine, as used herein, is to be understood as including, for example, franking machines and postage-calculating scales, i.e. mail scales, with an integrated postage calculator and similar mailing devices for which approval from the postal authorities is required.

Franking machines have been known since the 1920s and even today are constantly being further refined. Their principle is based on the idea that monetary data are managed in the franking machine. In each franking operation, the current residual amount is reduced in the descending register by the franking amount printed onto the item to be dispatched. When the residual amount has been used up, the franking machine can be recharged with a prescribed amount of credit. The residual amount is thereby incremented by the amount of the credit. For protection against manipulation, for example of the residual amount in the descending register, the franking machines are equipped with a security housing.

More recent franking machines produced and distributed by the assignee, Francotyp-Postalia AG & Co. of Germany, use digitally operating printing modules, such as for example, for the first time in the world, inkjet printers in the franking machines of the JetMail® type or thermal-transfer printers in the franking machines of the T1000 type. It is consequently possible in principle to print other information onto a filled letter in the region of the franking stamp or to carry out printing differently in any way desired.

Commonly assigned U.S. Pat. No. 5,805,711 (European patent EP 0 660 269 B1), entitled "Method of Improving the Security of Postage Meter Machines" describes a franking machine which has a closable and sealed flap, which allows access to the hardware behind (EPROM socket) only to a restricted group of especially trustworthy persons. It could be assumed here that no manipulation of the franking machine would be carried out by these persons. The closable and sealed flap is also referred to as the postal authority flap, which can be opened only by postal authority officials, for example to recharge a credit at the post office. Another solution proffered by the assignee is based on a flap which is appropriately designed for the "Master-PROM" method. In this method, a service technician changes the printing-block or postage-table ROM for a special ROM—the MASTER-PROM—which, after starting the JetMail, authorizes the technician to access regions of the machine which in some cases are highly sensitive. For example, this allows monetary amounts to be manipulated.

In the case of franking machines which are equipped with a digital printer, a promotional printing block can easily be changed. However, the number of promotional printing blocks is restricted by the storage capacity of the EPROM. The service technician should therefore have access at least to the printing-block EPROM socket, in order to be able to change the printing-block EPROM independently. Consequently, a solution was sought for a franking machine which, with the postal authority flap partly open, can nevertheless guarantee security. Commonly assigned European patent application EP 762 338 A2 proposes the formation of a MAC check sum in respect of the data content of an EPROM for checking the integrity of the data and the program code of printing-block EPROMs which are inserted into the externally accessible socket in the case of a franking machine with the postal authority flap open. The exchanging of the modules is relatively easy if the ROM modules are, for example, in DIL sockets. If in the future, in the course of component miniaturization, different forms of housing package are chosen, a connection via sockets will no longer be possible, i.e. the exchange of ROM modules will be made impossible for the service technician.

SUMMARY OF THE INVENTION

The object of the present invention is to provide a mailing machine which overcomes the above-noted deficiencies and disadvantages of the prior art devices and methods of this general kind, and which is provided with a ROM module with an initialization program, initialization data being introduced in a secure manner into the mailing machine via an externally accessible interface, so that unauthorized initializing is prevented. It is further intended that a secure method will manage without exchanging the ROM module and permit authorized initialization.

With the above and other objects in view there is provided, in accordance with the invention, a mailing machine assembly, comprising:
a mailing machine including a controller, a security module connected to the controller, and a non-removable program memory operationally connected to the security module and configured to store an initialization program; and
a removable authorization device to be operationally connected to the mailing machine and configured to be interrogated by the mailing machine;
wherein the security module is programmed to check whether authorization is present and for preventing an initialization of the mailing machine without authorization.

Initialization (INIT) is understood as meaning a routine for the input of initialization data taking place on one occasion at the single point of entry of the destination country before the machine is put into operation. For this purpose, a means of authorization is brought into operative connection with the mailing machine and is designed as an easily exchangeable electronic hardware unit (dongle or chip card). The latter is connected to the mailing machine either directly or indirectly via a data source, for example a personal computer PC. The mailing machine, for example a franking machine, has an unremovable program memory with an initialization program and a postal security module (postal security device or secure accounting device), which is designed as a means of checking the authorization of the input of initialization data. The latter takes place, when there is authorization, directly by using the keyboard of the franking machine or indirectly via the PC or laptop or from a data center into the meter or security module. The means of authorization, i.e., the authorization device, is brought into operative connection with the meter via interfaces of the PC or the machine.

In accordance with an added feature of the invention, the authorization device is directly or indirectly connected to the mailing machine via a data source selected from the group consisting of a personal computer, a laptop, and a remote data center.

In accordance with an additional feature of the invention, the mailing machine is a franking machine having a meter with a user interface, for a data input of predetermined INIT values, and a postal security device configured to check an authorization of the data input.

In accordance with another feature of the invention, the franking machine has a base with a first interface for attachment of the data source containing initialization data for the mailing machine, and a second interface for attachment of the authorization device.

In accordance with a further feature of the invention, the authorization device is a dongle.

In accordance with again an added feature of the invention, the data source contains initialization data for the mailing machine and is configured to be attached to the first interface of the base of the mailing machine, and wherein the authorization device is a chip card and a chip card reader is operatively connected to the meter via a further internal interface and arranged to be integrated into the base.

In accordance with again an additional feature of the invention, the interfaces (e.g., the above first, second and further interfaces) of the mailing machine are serial interfaces.

In accordance with again another feature of the invention, the first interface of the base of the mailing machine is configured for attachment of the data source, the authorization device is connected to the data source via a parallel interface, the data source is a computer and is coupled via a serial interface of the mailing machine, and wherein a chip card reader is integrated and operatively connected to the meter via an interface of the meter.

In accordance with again a further feature of the invention, the mailing machine is a franking machine with a meter and a chip card reader integrated in the meter and coupled to a parallel bus of the meter via an interface and wherein the authorization device is a chip card.

In accordance with yet an added feature of the invention, the mailing machine is a set of scales, and wherein a chip card reader is integrated into the scales and coupled via an interface of the scales, and wherein the authorization device is a chip card.

In accordance with yet an additional feature of the invention, the mailing machine has a modem and a modem interface for loading therethrough the initialization data or values, and wherein the authorization device is an insertable chip card, for authorizing at least that part of the INIT data or values which are loaded into the mailing machine from a data source via the modem interface.

In accordance with yet another feature of the invention, the mailing machine is a franking machine having at least one program memory with an initialization program and a postal security module, for checking the authorization before and during the initialization, and wherein the postal security module is configured for loading initialization data.

In accordance with yet a further feature of the invention, a checking of the authorization before and during the initialization is performed on the basis of a unique authorization number, input via a dongle or a chip card and wherein the authorization is given if the unique authorization number input into the mailing machine has a predetermined relationship with a number stored in the postal security module.

In accordance with again a further feature of the invention, a program memory stores at least partly the initialization program, the program memory forming a component part of the security module, and including a separate program memory operatively in connection with the security module and storing another part of the initialization program.

In accordance with yet again a further feature of the invention, the other part of the initialization program is for initialization data stored in a non-volatile manner externally of the security module.

With the above and other objects in view there is also provided, in accordance with the invention, a method of initializing a mailing machine, which comprises the steps of:
switching a mailing machine into an initialization mode;
authorizing an initialization with an authorization device and checking authorization with a security module, in order to prevent initialization without authorization;
if authorization is found, inputting initialization data at least partly supplied by a data source; and
ending the initialization and cancelling of the authorization.

In accordance with a preferred mode of the invention, the method comprises the following steps:
switching a franking machine into the initialization mode and establishing a connection to a data source (for example by connecting via a modem, a laptop, and/or a PC interface);
authorizing initialization with an authorization device;
inputting a battery date BAT_DATE_SAD of a battery of the security module, a telephone number of the telepostage data center TDC of the destination country and a postage call-up number PAN;
transmitting a serial number SAD-SN of the security module to the telepostage data center TDC of the country, to initialize a comparison of the serial number SAD-SN sent with a stored serial number, and to generate a notification;
receiving the notification sent by the telepostage data center TDC in the franking machine and loading codes DES-Keys for credit recharging into the security module SAD; and
terminating the initialization and cancelling the authorization by removing the authorization device.

In accordance with yet another feature of the invention, the method comprises switching into the initialization mode at the goods receiving location in the destination country as a result of activating a means of activating a user interface and establishing a connection to a data source via a transmission device selected from the group consisting of a modem, a laptop, and a PC interface.

Further, the notification sent by the telepostage data center TDC may include a code MAC-Key for a security imprint, which is received by the franking machine and loaded into the security module SAD.

In addition, the codes DES-Keys for credit recharging include the subcodes Key(0), Key(1), Kvar and are loaded into the security module SAD. The notification sent by the telepostage data center TDC includes extra data stored in a non-volatile memory externally of the security module and including the inkjet cartridge data.

Preferably, the initialization data are input with the chip card.

In accordance with a preferred feature of the invention, a data input of extra data includes inkjet cartridge data and and the data are stored in a non-volatile memory externally of the security module.

In accordance with a concomitant feature of the invention, the authorization device is interrogated before and during the initialization of the mailing machine with predetermined INIT data.

Other features which are considered as characteristic for the invention are set forth in the appended claims.

Although the invention is illustrated and described herein as embodied in a mailing machine and method of initializing it, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
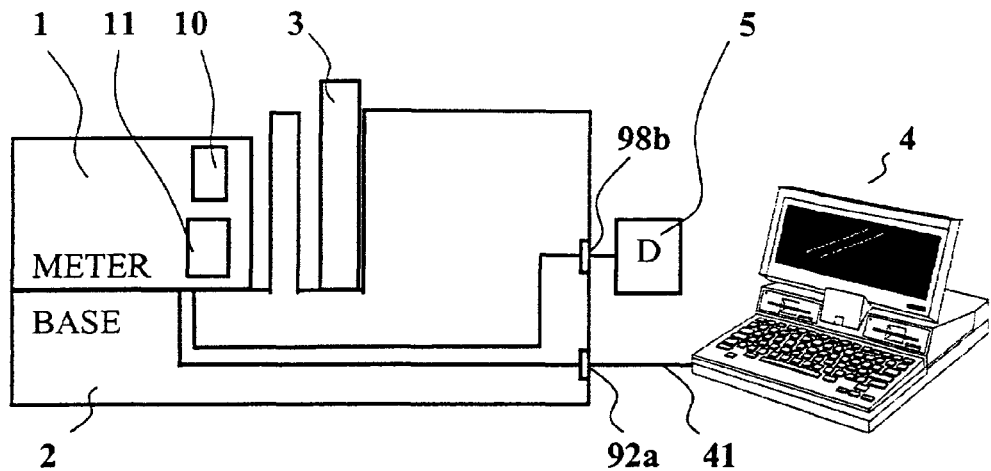
FIG. 1 is basic diagram with a data source and with a dongle, in each case at the interfaces of the base of a franking machine.

Referring now to the figures of the drawing in detail and first, particularly, to FIG. 1 thereof, there is seen a basic diagram with a data source and with a dongle, at the interfaces in each case of the base of a franking machine. The franking machine comprises a meter 1 and a base 2 and is equipped for franking an item of mail 3. A perspective view of the franking machine of the JetMail® type is represented from behind in FIG. 3. For its initialization, a data source 4 is connected to a first serial interface 92a of the franking machine. The data source 4 is, for example, a service PC or, preferably, a laptop. A dongle 5 is connected to a second serial interface 98b of the franking machine. The meter 1 of the franking machine has at least one program memory 10 with an initialization program and a security module 11, for checking the authorization before and during the initialization.

Figure 2:
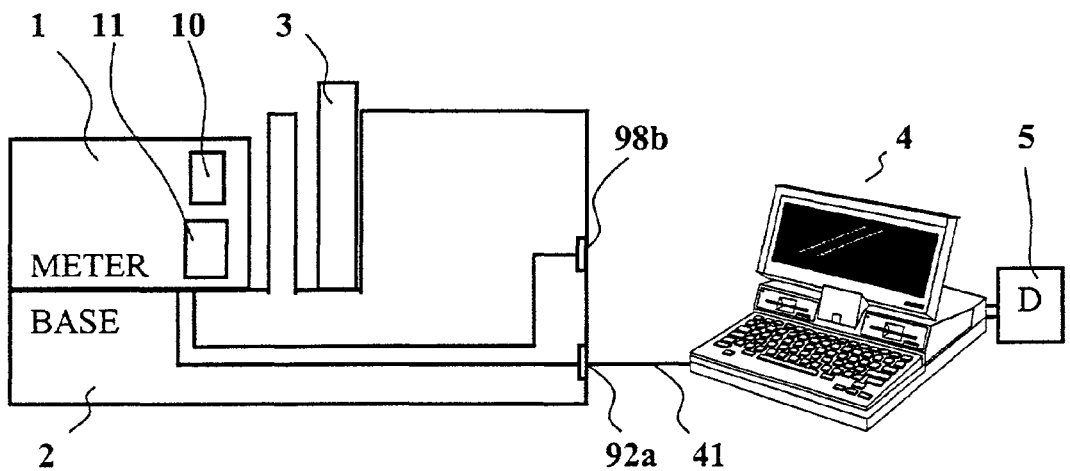
FIG. 2 is a basic diagram with a dongle at a data source which is connected at an interface of the franking machine.

FIG. 2 shows a basic diagram with a dongle 5 at the data source 4, which is connected to the first serial interface 92a of the franking machine. The second serial interface 98b of the franking machine remains free for other purposes. The franking machine comprises a meter 1 and a base 2, and allows franking of an item of mail 3. The meter 1 is equipped at least with a program memory 10 and with a security module 11.

Figure 3:
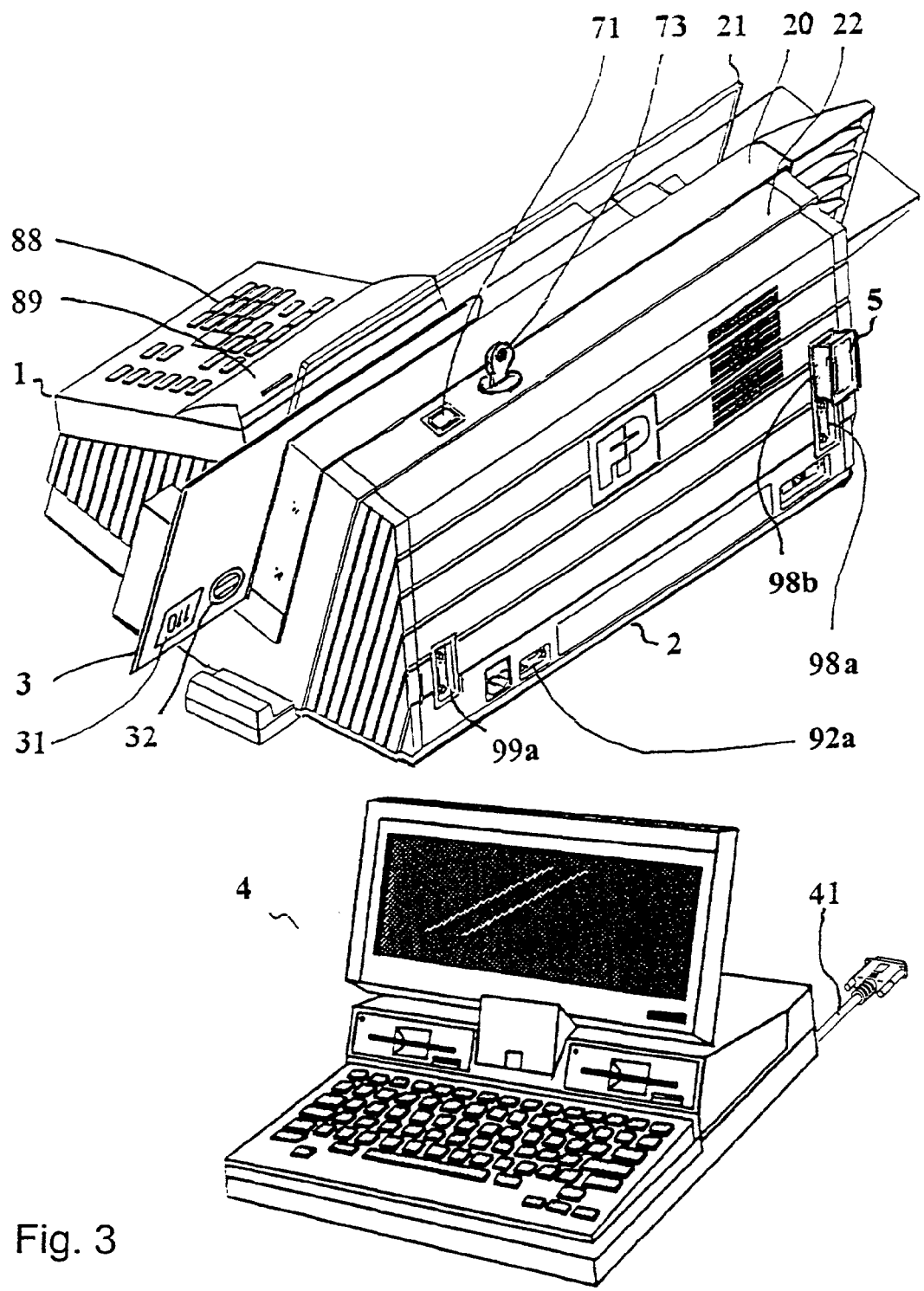
FIG. 3 is a perspective view of a franking machine of the JetMail® type with a dongle from behind and a view of a data source of the laptop type from the front.

In FIG. 3, a perspective view of a franking machine of the JetMail® type from behind is represented. The base 2 of the franking machine has a first serial interface 92a, at which the data source 4 can be connected. FIG. 3 also shows a view of a data source of the laptop type from the front, which can be connected via a cable 41 to the first serial interface 92a of the franking machine. Fitted onto the second serial interface 98b is a dongle 5. Both serial interfaces 92, 98b and further system interfaces 98a and 99a are located on the rear side of the franking machine and are in operative connection with the meter 1. The actuating elements 88 of a keyboard and the display elements 89 in the screen of a display unit of the meter 1 form a user interface, which is configured for the input of INIT values. However, a preferred means of input for the INIT values is the data source 4. The base 2 is equipped with a switch 71 and with a key-operated switch 73, which are arranged behind a guide plate 20 and are accessible from the upper edge 22 of the housing. Once the franking machine has been switched on by means of the switches 71 and 73, a fed-in letter 3, which is standing on edge and bears against the guide plate with its surface onto which printing is to be carried out, then has a franking stamp 31 printed onto it in a way corresponding to the input data. The letter-feeding opening is laterally bounded by a transparent plate 21 and the guide plate 20. Further stations or items of equipment can be connected to the interfaces 98a and 99a, in order to come into communication link with the franking machine. After the input of initialization data, including a zero credit value, a test takes place. During the franking with the postage value zero, only the value in the number-of-items register is incremented in the accounting operation. The postage value zero is in this case printed onto an item to be dispatched (letter 3).

Figure 4:
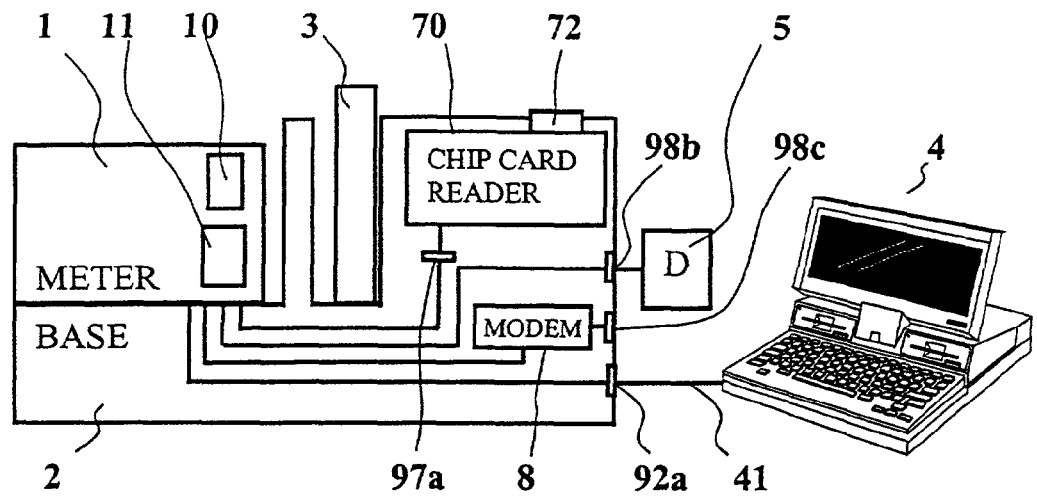
FIG. 4 is a basic diagram with a data source and with a dongle, in each case at the interfaces of the base of a franking machine and with a chip card reader integrated into the base, the dongle forming a means of authorization.

In FIG. 4, a basic diagram with a data source 4 at the interface 92a and with a dongle 5 at the interface 98b of the base 2 of a franking machine is represented. In the configurational variants according to FIGS. 1, 3 and 4, it is provided that the data source 4 contains data for initializing the franking machine 1, 2 and is designed such that it can be fitted onto the first interface 92a of the base 2 of the franking machine. The authorization device 5, also referred to as means of authorization or authorization means 5 is designed such that it can be fitted onto a second interface 98b of the base 2 of the franking machine. A dongle 5 preferably serves as the authorization means. Optionally contained in the base 2 are a modem 8 and a further interface 98c for the connection of the integrated modem 8 to a telephone network. The modem 8 can be used for example to charge an amount of credit from a remote data center into the postal security module 11 of the franking machine. With the postal security module 11, it can also be checked whether the initialization program stored in the program memory 10 is called up in the authorized way and is running properly. In the variant according to FIG. 4, the meter 1 is connected via a further internal serial interface 97a to a chip card reader 70 integrated into the base 2. After completion of the initializing process, a chip card or a smart card (not shown) can be inserted into the slot 72, in order to load further data. Such further data concern, for example, the image data for a predetermined location and date stamp. A method and arrangement for printing-stamp input into a franking machine has already been disclosed in the German patent application with the number 199 13 066.3, which is not a prior publication. Carrier-specific print-image data can be loaded, or selected for a country-specific variant of the franking machine, by means of a chip card.

Figure 5:
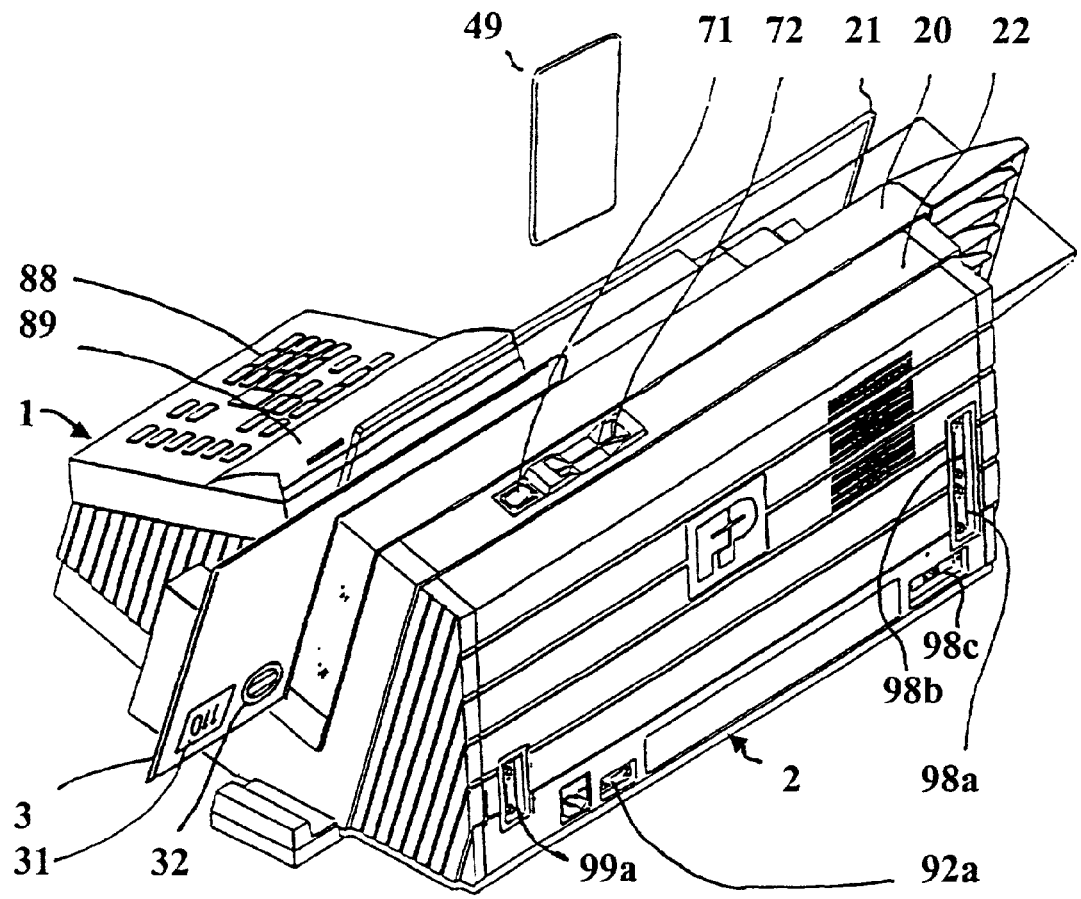
FIG. 5 is a perspective view of a franking machine of the JetMail® type from behind and with a chip card reader integrated into the base, a chip card forming the means of authorization.

FIG. 5 shows a perspective view of a franking machine of the JetMail® type from behind, which has a chip card (or, smart card) reader integrated into the base and a corresponding slot 72. The chip-card read/write unit 70 is arranged behind the guide plate 20 and is accessible from the upper edge 22 of the housing via the slot 72. After the franking machine has been switched on by means of the switch 71, a chip card 49 is inserted from above in the downward direction into the insertion slot 72. A dongle 5 is no longer needed in the variant according to FIG. 5, because an insertable chip card 49 serves here as the means of authorization. As in the configurational variants according to FIGS. 1, 3, 4, 7 and 9 as well, the means of authorization, chip card 49, is consequently connected directly to the franking machine. As a difference from the configurational variant according to FIG. 4, no laptop 4 is connected as the data source, since the input of the INIT values can also be realized in a different way, for example by using the chip card or via interface 98c and the modem.

Figure 6:
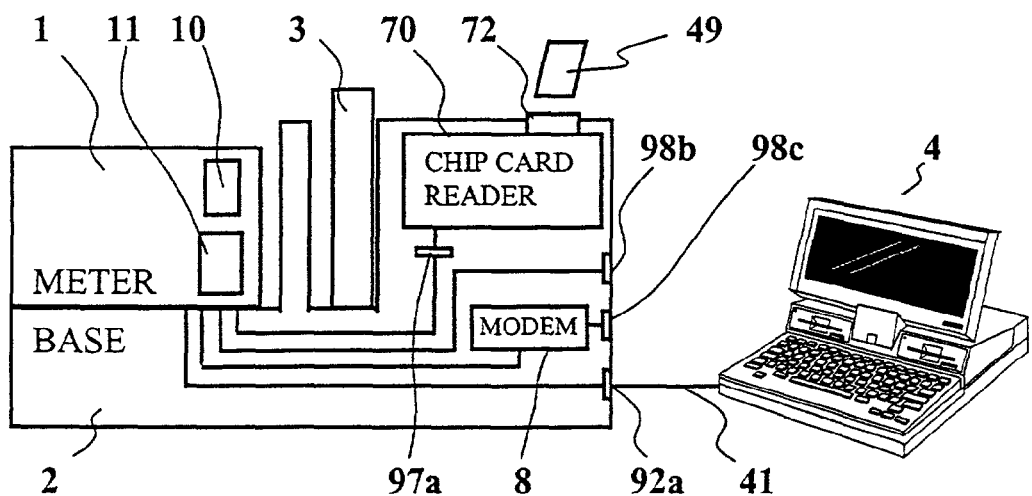
FIG. 6 is a basic diagram with a data source at the interfaces of the base of a franking machine and with a chip card reader integrated into the base, the chip card forming the means of authorization.

As a difference from the variant represented in FIG. 5, in a further configurational variant represented in FIG. 6 a data source 4 which contains the initialization data for a franking machine is provided. The data source 4 is configured such that it can be connected to a first interface 92a of the base 2 of the franking machine. In the same way as in the variant represented in FIG. 5, the means of authorization 5 is again a chip card 49, for which a chip card reader 70 is arranged such that it is integrated into the base 2. The chip card reader 70 is operatively connected to the meter 1 via a further internal interface 97a. The internal interface 97a is also a serial interface. The base 2 optionally contains a modem 8 and an interface 98c for the connection of the modem to a telephone network. The meter is constructed in the way already explained with reference to FIG. 4.

Figure 7:
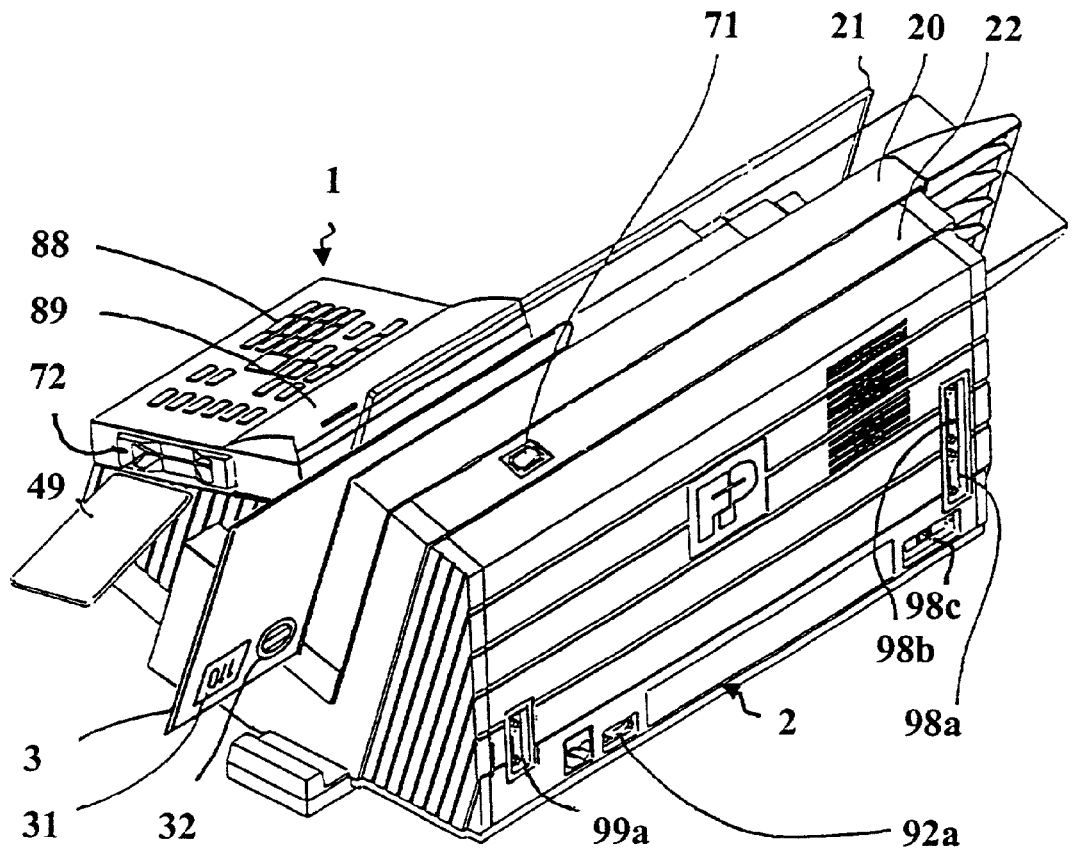
FIG. 7 is a perspective view of a franking machine of the JetMail® type from behind and with a chip card reader integrated into the meter, the chip card forming the means of authorization.

In FIG. 7, a perspective view of a franking machine of the JetMail® type from behind is represented, the meter 1 being equipped with an integrated chip card reader 70 and the chip card being the means of authorization. The chip card reader 70 integrated into the meter 1 of the franking machine is coupled—in a way not shown—to a bus of the meter 1 via an interface. It is otherwise designed in a way corresponding to the design already explained with reference to FIG. 5.

Figure 8:
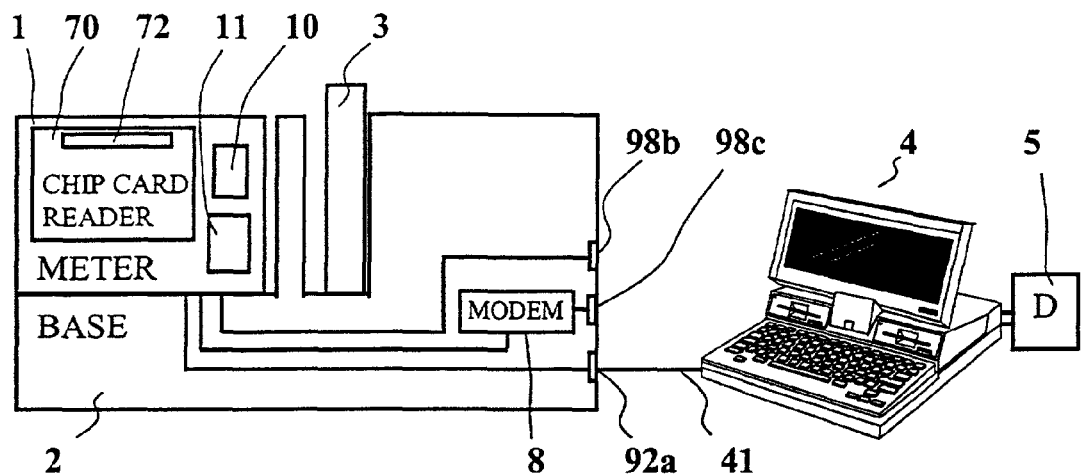
FIG. 8 is a basic diagram with a dongle at a data source which is connected at an interface of the franking machine, and with a chip card reader integrated into the meter, the dongle forming the means of authorization.

FIG. 8 shows a basic diagram with a dongle 5 on a data source 4, which is connected at an interface 92a of the franking machine, and with a chip card reader 70 integrated into the meter 1, although the dongle 5 is the means of authorization. The means of authorization (dongle) 5 is connected to the data source 4 via a parallel interface. The data source 4 is, for example, a personal computer or, preferably, a laptop. The data source 4 is coupled to the meter 1 via a serial interface 92a of the franking machine. Consequently, as in the configurational variant according to FIG. 2 as well, the means of authorization (dongle) 5 is connected to the franking machine in an indirect way. It is provided that the meter 1 has a program memory 10 for the initialization program and a postal security module 11 as a means for checking the authorization of an input of initialization data, or at least for the authorization of a data input of predetermined INIT values.

A chip card reader 70 has optionally been integrated into the meter 1. The chip card reader 70 is operatively connected in—a way not shown—to an internal bus via an interface of the meter 1. A chip card can, for example, be inserted laterally into a slot 72. The base 2 optionally contains a modem 8 and an interface 98c for the connection of the modem to a telephone network.

Figure 9:
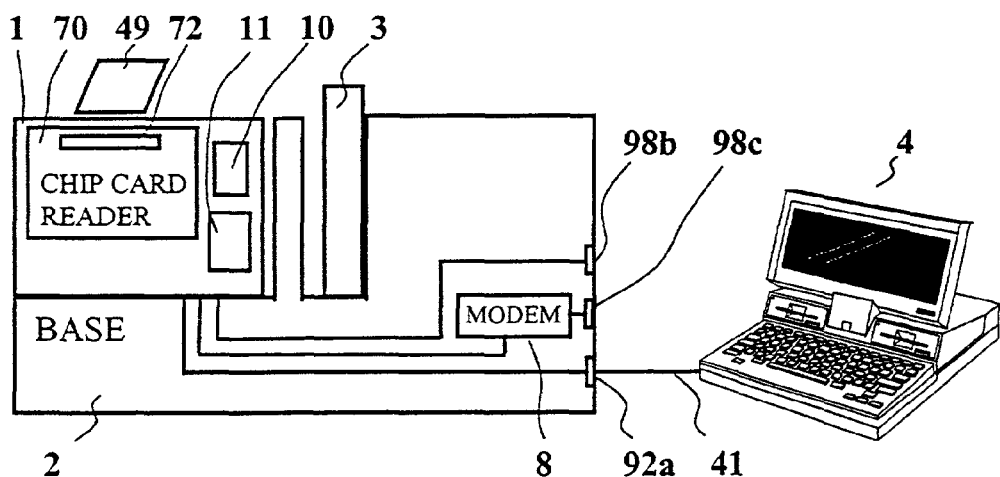
FIG. 9 is a basic diagram with a data source at the interfaces of the base of a franking machine and with a chip card reader integrated into the meter, the chip card forming the means of authorization.

In FIG. 9, the basic diagram for a configurational variant with a data source 4 connected to the interface 92a of the base 2 of a franking machine and with a chip card reader 70 integrated into the meter is represented, the chip card 49 forming the means of authorization. It is otherwise designed in a way corresponding to the design already explained with reference to FIG. 8.

In FIGS. 5, 6, 7 or 9, chip cards 49 are provided for insertion into the base 2 or into the meter 1 of the franking machine. The chip cards 49 contain, for example:

a card producer code MANCODE (15 bytes),
a franking-machine producer code FPCODE (one byte),
a code for the physical card type PHYSTYP (one byte),
a personalization code MINIPERS (6 bytes), which includes the code of the producer of the franking machine, the producer of the chip card and the producer of the chip of the chip card in combination,
a start date for the validity of the card VALSTARTDATE (4 bytes),
an end date for the validity of the card VALENDDATE (4 bytes),
an access code LOGICTYPE (1 byte), which shows that an authorization card exists, preferably for the vendor, and
a unique authorization number (4 bytes) and also if appropriate, a country code COUNTRYCODE (4 bytes).

It is provided that checking of the authorization is performed before and during the initialization on the basis of a unique authorization number, which is input via the chip card 49. Alternatively, the unique authorization number may be input via the dongle 5. The authorization is given if the input unique authorization number has a predetermined relationship with a number stored in the postal security module 11.

Figure 10:
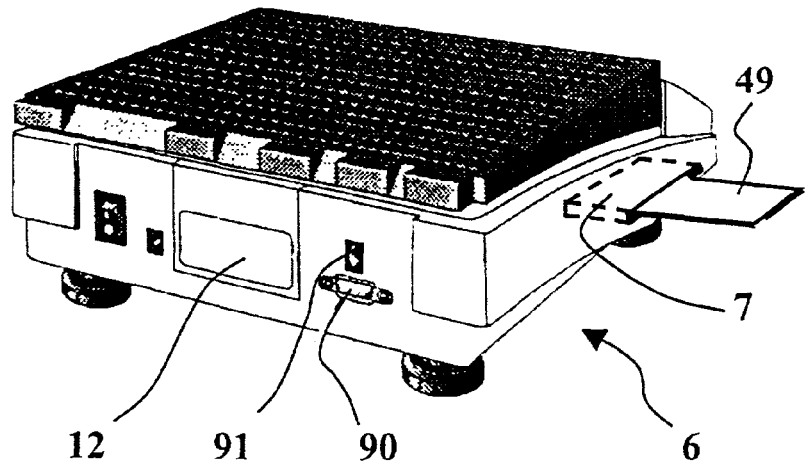
FIG. 10 is a perspective view of a set of scales from behind with an integrated chip card reader, the chip card being the means of authorization.

In another configurational variant represented in FIG. 10, the mailing machine is a set of scales 6 and the means of authorization is a chip card 49. A chip card reader 7 is integrated into the scales 6. A franking machine or an external modem (not shown) may be connected, in each case via interface 90 or 91, respectively. The set of scales contains, for example, a postage module 12, which additionally operates as a security module for checking the authorization of initialization data.

Figure 11:
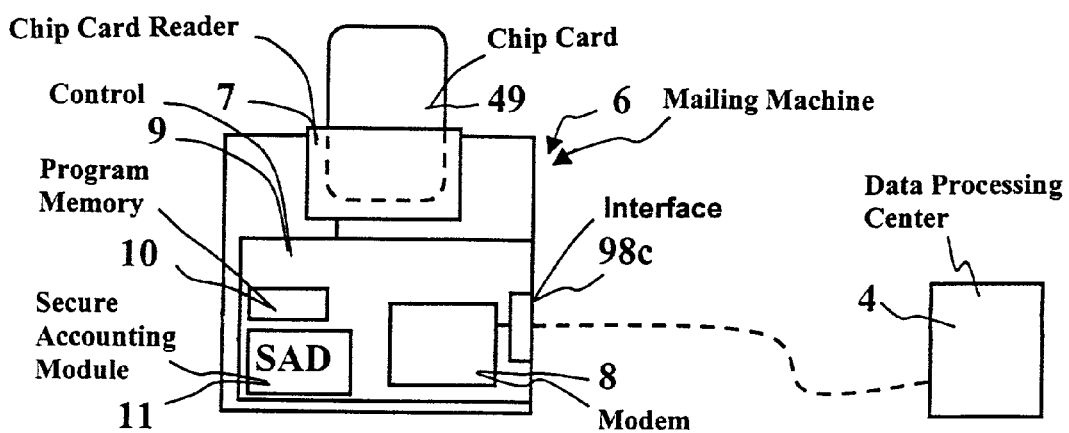
FIG. 11 is a basic diagram of a mailing machine with an SAD and a chip card with a modem interface for a data source.

In a further configurational variant—represented in FIG. 11—it is provided that a chip card 49 authorizes a data center 4 to supply a data stream for the initialization of the mailing machine 6. A data source 4 (laptop or personal computer PC or a workstation), which is remote from the mailing machine 6, has an integrated modem and is then connected to the controller 9 of the mailing machine 6 via a modem interface 98c, instead of via the PC interface 92a. The mailing machine may be, for example, a franking machine which cannot be separated into a meter and base and the controller 9 of which has a secure accounting module 11. A chip card reader 7, which is connected to the controller 9, is integrated into the mailing machine 6. In the program memory 10 of the controller 9, an initialization program is again stored. The remote data source 4 is a recharging center, for example an FP tele-postage data center, or a special data center which supplies the INIT data or values via interface 98c and modem 8. It is optionally possible to integrate the chip card reader 7 and/or the modem 8 into the controller 9 of the mailing machine 6. The initialization of a mailing machine takes place at the goods receiving location situated between the location of production and dispatch and the location of use. At the goods receiving location, the mailing machine is made ready for the customer. For example, a franking machine must firstly be registered with the FP data center of the respective country for which the mailing machine is intended. The goods receiving location and the location of use are preferably in the same country.

The process for initializing a mailing machine has the following steps:

Switching into an initialization mode;

Authorization of the initialization by means of a means of authorization, for example a chip card 49 or a dongle 5, and checking of the authorization by means of the security module 11, in order to prevent initialization without authorization;

Input of initialization data, which are at least partly supplied by a data source (data center 4). The initialization data may be input from a personal computer (PC) connected to a serial interface. The PC may in turn be connected to a data center 4 by means of a modem or a serial or parallel connection. The mailing machine may, however, also be connected to the data center 4 via a modem, in order that the initialization data can be input into the mailing machine. The initialization data may be codes which are necessary for the encoded transmission of data. Furthermore, equipment and producer IDs stored at the data center 4 may be transmitted, and customer-specific data (for example zip code/postal code), register values (minimum and maximum values for certain registers) may likewise be transmitted. After the transmission of initialization data, the mailing machine is enabled for use by a user. Charging with money is possible and so too is franking.

Ending of the initialization and cancelling of the authorization by removal of the means of authorization.

As in FIGS. 5, 6, 7 or 9, 10, 11, chip cards 49 are provided as the authorization means 5 and the mailing machine 6, or else the base 2 or the meter 1 of a franking machine, are equipped for the insertion of the chip card 49 with a chip card reader, with a modem interface 98c and with a modem. If the chip cards alone are provided for initialization, a chip card 49 is known as the initialization card (INIT card). All, or at least some, of the INIT data or values are then supplied to the franking machine from the remote data center via the modem interface 98c. The chip card 49 serves for authorizing at least that part of the INIT data or values which is loaded into the franking machine from the remote data center via a modem interface 98c. In FIGS. 5 and 7, the modem interface 98c is represented on the rear wall of the JetMail franking machine. In this case it is provided that the associated initialization program is stored at least partly in a program memory (EPROM), which is a component part of the security module 11. Another part of the initialization program, in particular for initialization data which are stored in a non-volatile manner externally of the security module 11, is a component part of a separate program memory (EPROM), which however is in connection with the security module 11. The security module prevents the loading or storing of data which are not authorized by the means of authorization 5 or 49. It is provided that interrogation of the means of authorization 5 or 49 is performed before and during the initialization of the mailing machine 1, 2 with predetermined INIT data.

The chip cards 49 are referred to hereafter as the INIT card or dealer card and allow the following exclusive access rights for:

initializing the franking machine in the initialization mode, testing the franking machine in the service mode, franking with the postage value zero in the franking mode and generating a master card for the purchaser or end-user of the franking machine, the master card offering access rights to all important functions of the franking machine which are not exclusive access rights of the dealer card.

The dealer card allows, for example, a master card to be generated twice in sequence. When a still "virgin" chip card is inserted, the franking machine detects automatically that a master card is to be generated and carries out this generation automatically. The data input of predetermined INIT values during initializing and subsequent testing are customary in the case of franking machines.

The following information comprises the INIT data which have to be entered into the franking machine during initializing at the point of entry of the respective destination country:

date of the battery of the security module,
telephone number of the data center,
postage call-up number PAN,
predetermined INIT values and
extra data and also
if appropriate, codes at least for remote value input.

In a non-volatile read/write memory, external of the security module, the extra data and also a large number of telephone numbers can be stored. The telephone number of the telepostage data center may be different in the case of voice input from that in the case of modem input and varies country-specifically. The other INIT data are loaded into the internal non-volatile read/write memory of the security module.

While data with a low number of places, such as for example the telephone number of the telepostage data center, the postage call-up number PAN and the date of the battery of the postal security module, can be input by keyboard, it is advantageous if a communication link to a data center is established by modem or a service computer allowing the required codes and any extra data to be loaded is connected.

Modern franking machines contain a security module. The latter is also referred to as a postal security device PSD or secure accounting device SAD. It is referred to as a postal security device PSD if it can generate a pair of cryptographic codes for a public key process. A method for the secure distribution of security modules with a PSD generating the codes is disclosed in commonly assigned, copending German patent application Nr. 100 20 904.1 (not prior art).

As a difference from this, in the case of a secret key process, only one common secret key is used. A secure accounting device is referred to hereafter if it can load a common cryptographic code. Like the franking machine, the computer of the data center at the location of receipt and initialization is equipped with a modem and the communication link line is regarded as secure.

During initializing, at least one common secret code DES-Key is loaded into a secure accounting device SAD, at least for the remote input of a credit when a secret key process is used. Furthermore, a common secret code MAC-Key of a mail carrier, required for generating a security imprint and its checking, may be loaded. The loading and constant presence of an initialization program in the program memory of the franking machine requires special security measures in the SAD (secure accounting device). For instance, the postal-relevant SAD serial number is pre-initialized already during production and can no longer be changed later unless a new SAD is installed. A serial number of the franking machine is not the same as the SAD serial number and in postal terms is of no further relevance. The franking machine is packed into a box on which a label with the SAD serial number is adhesively attached. The box is dispatched to a destination country remote from the location of production. At the goods receiving location of the destination country (single point of entry), initializing takes place after unpacking. If parameters of the franking machine have to be changed in the initialization mode, a record is kept of who makes these changes. Each dealer card has a unique authorization number for enabling the initialization mode.

During initializing, the following steps are carried out:
switching a franking machine into an initialization mode, for example as the result of activating a means of activating the user interface, and establishing a connection to a data source (4) via a modem or by means of a laptop or PC interface;
authorization of the initialization by means of a means of authorization (5), for example by means of an FP card inserted into the chip card reader;
input at least of the date BAT_DATE_SAD, for example=07 00, of the battery of the security module (11) SAD, a telephone number of the telepostage data center TDC of the destination country and a postage call-up number PAN, for example=101 04711;
sending of the serial number SAD-SN of the security module (11) to the telepostage data center TDC of the country, a comparison of the serial number SAD-SN sent with a stored serial number taking place there, and a notification being generated;
reception of a notification sent by the telepostage data center TDC by the franking machine and loading at least of codes DES-Keys for credit recharging into the security module (11) SAD, the latter including: Key(0), Key (1), Kvar;
ending of the initialization and cancellation of the authorization by removal of the means of authorization (5), for example the FP card.

The data input may take place via a keyboard or via a chip card. In the case of mailing machines which print by an inkjet printing process, it is provided that a data input of extra data, which include inkjet cartridge data, takes place. The inkjet cartridge data include a producer identification number, which is the same for all the producer's ink cartridges which may be used in the mailing machine. It is alternatively provided that the notification sent by the telepostage data center TDC has the inkjet cartridge data. The extra data are stored externally from the security module in the non-volatile read/write memory (not shown).

It is also provided for franking machines that the notification sent by the telepostage data center TDC includes a code MAC-Key for a security imprint, which is received by the franking machine and loaded into a non-volatile memory of the security module 11.

After the aforementioned initialization process, the initialization of the SAD is completed and the printing machine goes to the vendor to go on sale. At the vendor, in the event of a customer order, the customer data and specifications are registered and transmitted to a separate printing block department. At the separate printing block department:
printing block data (e.g., logo) are generated;
graphics and address data are assigned to customer data and stored in a central database;
a chip card is sent to the customer, either a specification printing block or dummy printing block (graphics and address data) being supplied.

At the customer's, the aforementioned graphics and address data and other customer-specific data are loaded from a chip card as part of an authorization process and access authorization cards are produced in accordance with a hierarchy. Their storage takes place in the meter but not in the SAD.

The automatic installation at the customer's by modem was proposed in principle first in the commonly assigned, copending German patent application Nr. 199 13 067.1 (not prior art), and the loading of further data (printing blocks relating to localities, promotional advertising, carriers) at the vendor by chip card was proposed in principle in the commonly assigned, copending German patent application Nr. 199 13 066.3 (not a prior art). The aforementioned applications have the following titles: Method for the automatic installation of franking devices and arrangement for carrying out the method and Method and arrangement for printing-stamp input into a franking machine, and as far are necessessary for a better understanding of this invention, all of the above-mentioned copending disclosures are herewith incorporated by reference.

As part of a validation process, the postage call-up number PAN is manually input again only during the first remote input for credit charging and is compared in the meter with the stored postage call-up number PAN, and then a credit charging is carried out by modem. The credit storage takes place in the SAD.

The invention is not restricted to the present embodiment. Rather, a number of variants are conceivable within the scope of the claims. For instance, further other configurations of the invention, based on the same basic idea of the invention and covered by the attached claims, can obviously be developed or used.

I claim:

1. A mailing machine assembly, comprising:
a mailing machine including a controller, a security module connected to said controller, and a non-removable program memory operationally connected to said security module and configured to store an initialization program; and
a removable authorization device for providing an authorization of an initialization of said mailing machine, said authorization device being operationally connected to said mailing machine; and
said security module being programmed to check whether said authorization device has provided the authorization of the initialization of said mailing machine and to prevent the initialization of said mailing machine without authorization from said authorization device;
wherein the initialization includes inputting initialization data to said mailing machine.

2. The mailing machine assembly according to claim 1, wherein said authorization device is indirectly connected to said mailing machine via a data source selected
from a group consisting of a personal computer, a laptop, and a remote data center.

3. The mailing machine assembly according to claim 2, wherein said mailing machine is a franking machine having a meter with a user interface, for a data input of predetermined values, and a postal security device configured to check an authorization of the data input.

4. The mailing machine assembly according to claim 3, wherein said franking machine has a base with a first interface for attachment of said data source containing initialization data for said mailing machine, and a second interface for attachment of said authorization device.

5. The mailing machine assembly according to claim 4, wherein said authorization device is a dongle.

6. The mailing machine assembly according to claim 4, wherein said data source contains initialization data for said mailing machine and is configured to be attached to said first interface of said base of said mailing machine, and wherein said authorization device is a chip card and a chip card reader is operatively connected to said meter via a further internal interface and arranged to be integrated into said base.

7. The mailing machine assembly according to claim 4, wherein said first, second and further interfaces of said mailing machine are serial interfaces.

8. The mailing machine assembly according to claim 4, wherein said first interface of said base of said mailing machine is configured for attachment of said data source, said authorization device is connected to said data source via a parallel interface, said data source is a computer and is coupled via a serial interface of said mailing machine, and wherein a chip card reader is integrated and operatively connected to said meter via an interface of said meter.

9. The mailing machine assembly according to claim 3, wherein said interface is a serial interface.

10. The mailing machine assembly according to claim 1, wherein said authorization device is directly connected to said mailing machine.

11. The mailing machine assembly according to claim 1, wherein said mailing machine is a franking machine with a meter and a chip card reader integrated in said meter and coupled to a parallel bus of said meter via an interface and wherein said authorization device is a chip card.

12. The mailing machine assembly according to claim 1, wherein said mailing machine is a set of scales, and wherein a chip card reader is integrated into said scales and coupled via an interface of said scales, and wherein said authorization device is a chip card.

13. The mailing machine assembly according to claim 1, wherein said mailing machine has a modem and a modem interface for loading therethrough the initialization data or values, and wherein said authorization device is an insertable chip card, for authorizing at least that part of the initialization data which are loaded into said mailing machine from a data source via said modem interface.

14. The mailing machine assembly according to claim 1, wherein said mailing machine is a franking machine having at least one program memory with an initialization program and a postal security module, for checking the authorization before and during the initialization, and wherein said postal security module is configured for loading initialization data.

15. The mailing machine assembly according to claim 14, wherein a checking of the authorization before and during the initialization is performed on the basis of a unique authorization number, input via a dongle or a chip card and wherein the authorization is given if the unique authorization number input into the mailing machine has a predetermined relationship with a number stored in said postal security module.

16. The mailing machine assembly according to claim 1, which comprises a program memory at least partly storing the initialization program, said program memory forming a component part of said security module, and including a separate program memory operatively in connection with said security module and storing another part of the initialization program.

17. The mailing machine assembly according to claim 16, wherein the other part of the initialization program is for initialization data stored in a non-volatile manner externally of the security module.

18. A method of initializing a mailing machine, which comprises the steps of:
switching a mailing machine into an initialization mode;
providing an authorization of an initialization of the mailing machine with a removable authorization device, wherein the initialization includes inputting initialization data to the mailing machine;
with a security module, checking the authorization provided by the authorization device in order to prevent initialization of the mailing machine without the authorization;
if the security module finds that the authorization device has provided the authorization, inputting initialization data at least partly supplied by an electronic data source to the mailing machine; and
ending the initialization and cancelling of the authorization.

19. The method according to claim 18, which comprises:
switching a franking machine into the initialization mode and establishing a connection to a data source;
authorizing initialization with an authorization device;
inputting a battery date BAT_DATE_SAD of a battery of the security module, a telephone number of the telepostage data center TDC of the destination country and a postage call-up number PAN;
transmitting a serial number SAD-SN of the security module to the telepostage data center TDC of the country, to initialize a comparison of the serial number SAD-SN sent with a stored serial number, and to generate a notification;
receiving the notification sent by the telepostage data center TDC in the franking machine and loading codes DES-Keys for credit recharging into the security module SAD; and
terminating the initialization and cancelling the authorization by removing the authorization device.

20. The method according to claim 19, wherein the establishing step comprises connecting via a transmission device selected from a group consisting of a modem, a laptop, and a PC interface.

21. The method according to claim 19, which comprises switching into the initialization mode at the goods receiving location in the destination country as a result of activating a means of activating a user interface and establishing a connection to a data source via a transmission device selected from the group consisting of a modem, a laptop, and a PC interface.

22. The method according to claim 19, comprising sending notification by the telepostage data center TDC including a code MAC-Key for a security imprint, which is received by the franking machine and loaded into the security module SAD.

23. The method according to claim 19, comprising providing the codes DES-Keys for credit recharging including the subcodes Key(0), Key(1), Kvar and loading the codes into the security module SAD.

24. The method according to claim 23, comprising sending the notification by the telepostage data center TDC including extra data stored in a non-volatile memory externally of the security module and including inkjet cartridge data.

25. The method according to claim 18, wherein the inputting step comprises inputting initialization data with the chip card.

26. The method according to claim 18, comprising providing data input of extra data including inkjet cartridge data and storing the data in a non-volatile memory externally of the security module.

27. The method according to claim 18, which comprises interrogating the authorization device before and during the initialization of the mailing machine with predetermined data.

* * * * *